(12) United States Patent
Simoens et al.

(10) Patent No.: US 7,347,319 B2
(45) Date of Patent: Mar. 25, 2008

(54) TILTING ROLLER

(75) Inventors: Herve Simoens, Marcq en Baroeul (FR); Olivier Lacroix, Limpiville (FR)

(73) Assignee: Societe Financiere de Gestion, Roubaix (FR)

( * ) Notice: Subject to any disclaimer, the term of this patent is extended or adjusted under 35 U.S.C. 154(b) by 0 days.

(21) Appl. No.: 11/041,867

(22) Filed: Jan. 25, 2005

(65) Prior Publication Data

US 2005/0173229 A1 Aug. 11, 2005

(30) Foreign Application Priority Data

Feb. 10, 2004 (EP) .................................. 04350001

(51) Int. Cl.
*B65G 15/08* (2006.01)

(52) U.S. Cl. ....................... 198/824; 198/782; 198/818; 198/823; 193/35 SS

(58) Field of Classification Search ................ 198/782, 198/818, 823, 824; 193/35 SS
See application file for complete search history.

(56) References Cited

U.S. PATENT DOCUMENTS

| | | | | |
|---|---|---|---|---|
| 2,969,878 A * | 1/1961 | Finney, Jr. | ................. | 209/430 |
| 3,077,974 A * | 2/1963 | Baechli | ...................... | 198/824 |
| 3,126,090 A * | 3/1964 | Bitzer | ........................ | 198/824 |
| 4,510,981 A * | 4/1985 | Biller | ...................... | 144/248.5 |
| 4,720,005 A * | 1/1988 | Beresinsky | ................ | 198/359 |
| 4,789,056 A * | 12/1988 | Bourbeau | .................. | 198/823 |
| 4,819,791 A * | 4/1989 | Melander | .................... | 198/818 |
| 5,007,528 A * | 4/1991 | Hideharu | ................... | 198/823 |
| 5,103,967 A * | 4/1992 | Stoll | .......................... | 198/823 |
| 5,267,642 A * | 12/1993 | Gharpurey et al. | ...... | 198/836.1 |
| 5,350,053 A * | 9/1994 | Archer | ....................... | 198/525 |
| 6,269,943 B1 * | 8/2001 | Mott | .......................... | 198/823 |
| 6,367,617 B1 * | 4/2002 | Schiesser et al. | .......... | 198/782 |
| 2002/0153231 A1 * | 10/2002 | Horne | .................. | 198/810.01 |

* cited by examiner

*Primary Examiner*—Gene O. Crawford
*Assistant Examiner*—Leslie A Nicholson, III
(74) *Attorney, Agent, or Firm*—Miles & Stockbridge P.C.; Edward J. Kondracki

(57) ABSTRACT

The subject of the invention is a retention device for a conveyor roller, characterised in that the roller (7) is mounted on a tilting support (13).

15 Claims, 2 Drawing Sheets

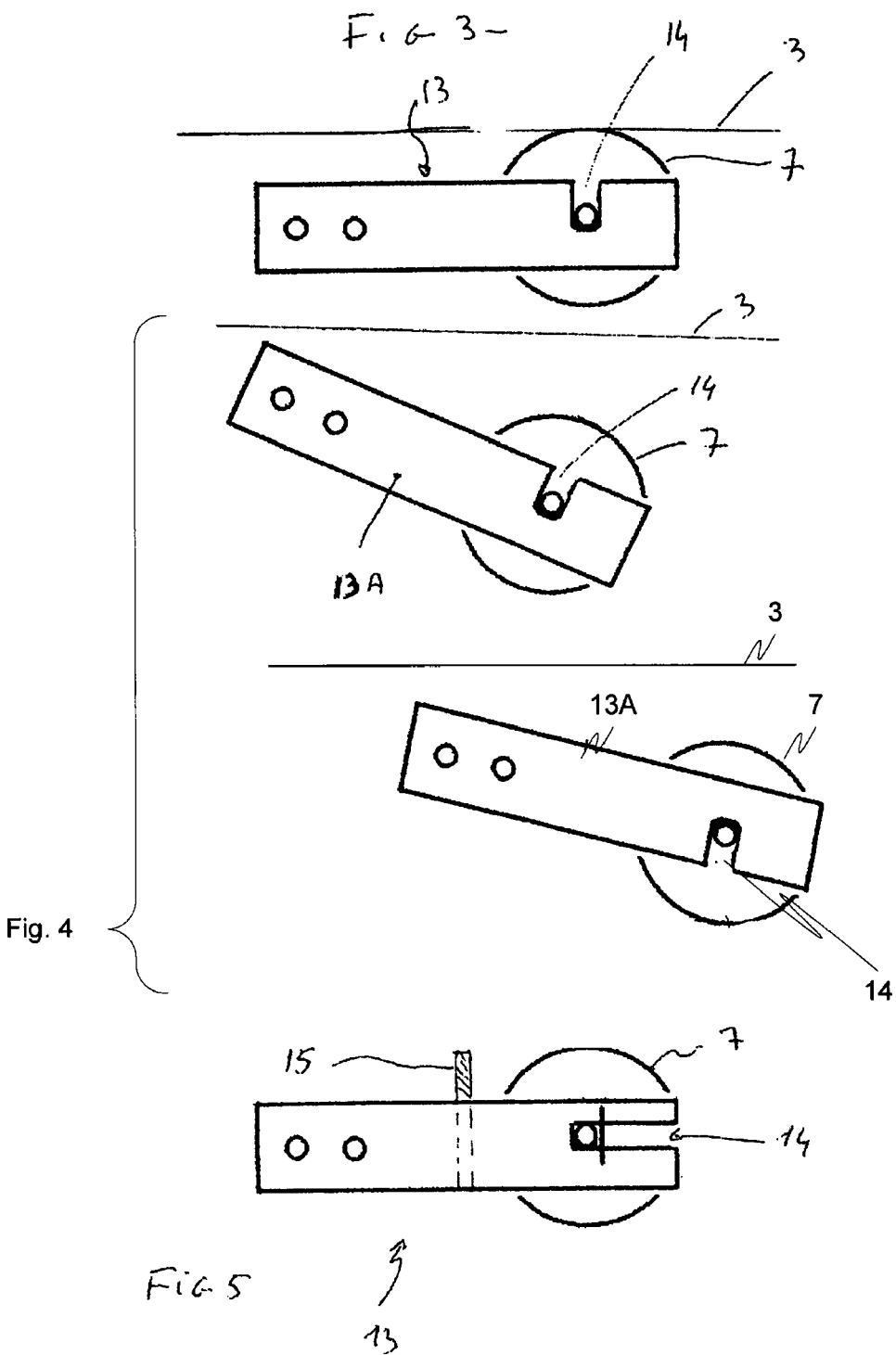

TILTING ROLLER

RELATED APPLICATION

This application is related to a co-pending application Ser. No. 11/041,866 filed concurrently herewith in the name of Hervé SIMOENS and Olivier LACROIX and entitled "Tilting Wall". The subject matter of said application is hereby incorporated by reference in its entirety.

BACKGROUND OF THE INVENTION

1. Field of the Invention

The invention relates to a retention device for a roller of a belt conveyor or a batten-type belt. It also relates to the conveyor equipped with the said device.

2. Description of Related Art

The transfer of products, particularly in bulk from one place to another, can be effected with different appliances, the choice of which depends on different parameters such as the distance transported, the volume to be transported per unit of time, and so on. Conventionally, a belt conveyor consists of an endless belt carried along on a succession of rollers supported by a chassis.

When these endless-belt conveyors are carrying bulk products, the active part of the belt must be shaped into a V or a U in order to constitute a sort of gully or trough containing the product throughout its journey. At the present time, in order to obtain this V or U shape, the belt employs sets of supporting rollers placed along the length of the trajectory, and sideways to the said trajectory.

The geometrical positioning of such an assembly determines the degree of concavity of the belt and therefore the desired profile.

In general, for this guidance assembly, use is made of a central horizontal, roller and two or more lateral rollers which are inclined in relation to the horizontal so as to raise the edges of the endless belt.

Access to the various rollers is not easy, and in the case of heavy materials the presence of dust necessarily increases the servicing work. The associated shut-downs are very lengthy, since it is necessary to remove the brackets that hold the axle of the roller so as to be able to release the roller.

SUMMARY OF THE INVENTION

The invention proposes to provide a solution to the particular problems mentioned above.

To this end, the subject of the invention is a retention device for a conveyor roller on which an endless belt is carried, where this device is characterised in that the roller is carried on a tilting support.

It also relates to the conveyor equipped with the said retention device.

BRIEF DESCRIPTION OF THE DRAWINGS

The invention will be properly understood by reference to the following description, provided as a non-exhaustive example with regard to the drawing, which diagrammatically represents:

FIG. 3: View of a retention device for a roller in the active position.

FIG. 4: View of a retention device for a roller in the inactive position.

FIG. 5: A variant of a retention device for a roller.

DESCRIPTION OF THE PREFERRED EMBODIMENT(S)

Figure 2:
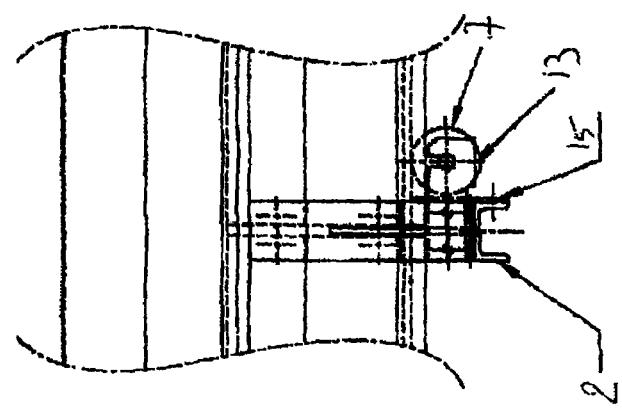
FIG. 2: Lateral view of FIG. 1

By referring to the drawing, we see a belt-type or batten-type conveyor (1).

Conventionally, a conveyor (1) consists of:

an endless transporting surface (3), carried along by a chassis (2), moving on a guidance surface (4) forming a profile such as a curve, for example.

As an example, the guidance surface is shaped by a roller (7).

Figure 1:
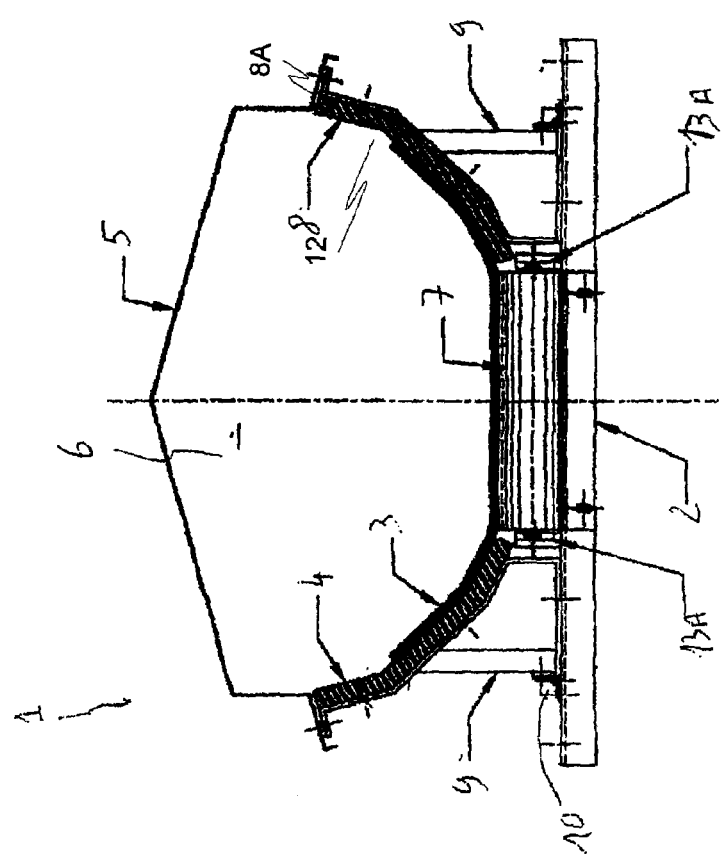
FIG. 1: View in transverse section of an example of a conveyor.

In the example shown in FIG. 1, mounted above the endless belt or surface (3) is a cover (5), possibly hinged, so as to constitute a closed volume (6). The edges of the transporting endless surface (3) have to be raised to form a gully, designed to contain the bulk material deposited upon this conveyor. Known tensioners and drive resources provide for the movement of the endless belt. The transported material moves in a tunnel which is open at both ends. The curvature of the belt on the transverse axis, or the profile, is determined by a horizontal roller (7) and two curved lateral surfaces (8) located on either side of the aforementioned roller, or other rollers.

In order to facilitate maintenance, it has been arranged that the horizontal roller (7) is mounted on a tilting support (13) that allows it to be released rapidly in order to change it. In the active position, this roller (7) occupies a fixed position where it is applied against the belt and supports it.

In the maintenance position, the roller is tilted downward to move it away from the belt.

As an example, this support consists of two cheek-plates (13A) each with a slot (14) allowing the rotating axle of the horizontal roller to slide into them.

The slots (14) are designed to engage the axle of the roller from the top. The slots open out toward the top.

Thus when the support is raised, the roller is applied beneath the belt. This roller (7) cannot therefore exit from these slots. The slots (14) could open out toward the front or the bottom.

The cross member which carries the roller is equipped with a protective entry-prevention device (15). It is advantageous that the support has this protective entry-prevention device (15), limiting risk that an item of clothing may be trapped by the roller and the belt. It consists of a plate (15) which is positioned upstream of the roller. These arrangements greatly facilitate technical servicing.

In fact, after tilting the support, the roller becomes more accessible by moving away from the endless belt. It is also possible to turn it freely on its axis, when this was not the case previously. This technical aspect functions on any belt conveyor laid out on an essentially flat or curved plane.

Depending on the method of implementation represented, we have described a conveyor with a curved profile. As can be seen, each lateral surface (8) is extended laterally beyond the surface on which the endless belt is resting. At least locally, at least one of the lateral surfaces (8) is fixed to the chassis rapid attachment devices (9) so as to constitute a sort of access door rapidly providing an opening.

By rapid attachment devices is meant a latch or a coarse-pitch screw, as opposed to a series of bolts requiring a long time to undo, and even as long as 10 minutes. The lateral surface (8) therefore has the function of guiding the endless belt in addition to an access-door function.

Throughout the length of the trajectory, the lateral surface formed by the lateral wall is continuous. Doubtless one could provide breaks, but these would reduce the effectiveness of the containment.

Thus with the cover (5), one constitutes a closed tube, but one which nevertheless includes an opening at the base. This opening is located at the position of the horizontal rollers placed all along the trajectory.

It is preferable that the removable lateral surface (8) should be supported by guidance elements (10) which are employed to move it between two positions that have been determined in advance. A locking action will be performed by a simple latch to be operated or released. In a first method of implementation, these guidance elements (10) are able to effect sideways guidance by means of at least one slide and its runner, for example.

According to another method, each element (8) of the lateral wall is secured by at least one hinge so as to achieve tilting or rotation about an axis determined during assembly. We have represented the arrangement as an axial articulation parallel to the movement axis of the endless belt. The hinge is placed at the base of the lateral wall.

This hinge could be on a vertical axis, with each lateral wall behaving as a single-leaf door. One only has to tilt the support carrying the curved lateral surface to clear the access to the belt.

This aspect allows very easy displacement of a part of the lateral wall of the conveyor in order to gain access to the interior of the material containment tube. Likewise, if material is introduced into the space located between the lower face of the belt and the upper face of the curved lateral surface, it exits via the interstice that exists between the roller and the curved lateral surface. It is preferable that the lateral surfaces (8) should be removable at all points.

As can be seen on the drawing, the active face of the lateral surface (8) is composed of at least two planes or two curves, forming between them a break (12) employed to stop the belt in its the lateral movement. In fact, during its movement, the belt is not held rigorously in its axial motion, but also moves laterally. Thus, when the edge of the belt encounters the break, and the force to go beyond this break has to increase, the belt starts back in the other direction due to the reaction phenomenon.

The lateral walls can be made of steel, for example. At least the active surface of the lateral surfaces is slightly rough. A layer of a material that facilitates the sliding action can cover the lateral surface. As can be seen, the cover is raised in order to increase the volume of the tube and limit excess pressures.

The free edge (8A) of the lateral wall presenting the lateral surface is solidly attached to the cover by a removable securing device such as a latch.

The tilting retention device is guided in rotation about an axis, and a latch, formed for example by a bolt, locks the tilting support in the active position of the roller resting on the belt.

What is claimed is:

1. A conveyor comprising:
    an endless belt having an upper delivery portion and a lower return portion,
    a tilting support,
    a roller being mounted on the tilting support and,
    at least two curved lateral surfaces located on either side of the roller and continuous along a longitudinal axis of the endless belt throughout the entire length of the upper delivery portion of the endless belt,
    the roller being mounted on the tilting support and adapted to move between a first, fixed position where the roller is in contact with and supports the endless belt and a second position where the roller is tilted away from and does not contact the endless belt,
    the endless belt remaining in contact with the lateral surfaces, regardless of the position of the roller, and
    the lateral surfaces being non-rotational.

2. A conveyor in accordance with claim 1, wherein the support consists of two cheek-plates.

3. A conveyor in accordance with claim 1, wherein the support includes two slots to accommodate an axle of the roller.

4. A conveyor in accordance with claim 3, wherein the roller is horizontal and the slots open out and upwardly.

5. A conveyor in accordance with claim 3, wherein the roller is horizontal having a front side and the slots open out toward the front side.

6. A conveyor in accordance with claim 3, wherein the roller is horizontal and the slots open out and downwardly.

7. A conveyor in accordance with claim 1, wherein the support carries a protective entry-prevention device.

8. A conveyor comprising:
    an endless belt having an upper delivery portion and a lower return potion;
    a roller surface having outer ends and comprising at least one horizontal roller, adapted to support the endless belt;
    at least two curved lateral surfaces located on either side of the roller and continuous along a longitudinal axis of the endless belt throughout the entire length of the upper delivery portion of the endless belt, the lateral surface being non-rotational and adapted to further support the endless belt; and
    a retention device having a tilting support with a tilt axis transverse to a longitudinal axis of the endless belt,
    the width of the belt being extended beyond the outer ends of the roller surface.

9. A retention device in accordance with claim 8, wherein the support consists of two cheek-plates.

10. A retention device in accordance with claim 8, wherein the support includes two slots to accommodate an axle of the roller.

11. A retention device in accordance with claim 10, wherein the slots open out and upwardly.

12. A retention device in accordance with claim 10, wherein the roller has a front side and the slots open out toward the front side.

13. A retention device in accordance with claim 10, wherein the slots open out and downwardly.

14. A retention device in accordance with claim 8, wherein the support carries a protective entry-prevention device.

15. A conveyor comprising:
    an endless belt having an upper delivery portion and a lower return portion, and
    a guide for the upper delivery portion of the belt, the guide comprising at least two curved lateral surfaces being continuous along a longitudinal axis of the endless belt throughout the entire length of the delivery portion of the endless belt and located on either side of a roller that is mounted on a tilting support with a tilt axis transverse to the longitudinal axis of the endless belt,
    the roller being adapted to move between a first position where the roller is in contact with and supports the upper delivery portion of the belt and a second position where the roller is tilted away from and does not contact the upper deliver portion of the endless belt,
    the upper deliver portion of the belt being further supported by the curved lateral surfaces, regardless of the position of the roller, and
    the width of the belt being greater than the width of the roller.

* * * * *

UNITED STATES PATENT AND TRADEMARK OFFICE
CERTIFICATE OF CORRECTION

PATENT NO. : 7,347,319 B2  Page 1 of 1
APPLICATION NO. : 11/041867
DATED : March 25, 2008
INVENTOR(S) : Herve Simoens and Olivier Lacroix It is certified that error appears in the above-identified patent and that said Letters Patent is hereby corrected as shown below:

Column 4, Line 17 claim 8, replace "potion" with --portion--.

Column 4, Line 60 claim 15, replace "deliver" with --delivery--.

Column 4, Line 61 claim 15, replace "deliver" with --delivery--.

Signed and Sealed this

Fifteenth Day of July, 2008

JON W. DUDAS
*Director of the United States Patent and Trademark Office*